United States Patent [19]

Ichikawa et al.

[11] Patent Number: 5,259,742
[45] Date of Patent: Nov. 9, 1993

[54] MOLD CLAMPING DEVICE FOR TIRE VULCANIZING MACHINE

[75] Inventors: Katsumi Ichikawa; Keiji Ozaki; Akihiko Masagaki, all of Kobe, Japan

[73] Assignee: Kabushiki Kaisha Kobe Seiko Sho, Kobe, Japan

[21] Appl. No.: 884,158

[22] Filed: May 18, 1992

[30] Foreign Application Priority Data

May 20, 1991 [JP] Japan .................................. 3-145651

[51] Int. Cl.⁵ ............................................. B29C 35/00
[52] U.S. Cl. ............................. 425/47; 425/192 R; 425/195; 425/411
[58] Field of Search ............. 425/450.1, 451.9, 28.1, 425/35, 595, 58, 47, 182, 195, 395, 408, 411, 192 R; 100/918

[56] References Cited

U.S. PATENT DOCUMENTS

| | | | |
|---|---|---|---|
| 3,932,084 | 1/1976 | Reilly | 425/182 |
| 4,332,540 | 6/1982 | Van de Caveye | 425/182 |
| 4,676,474 | 6/1987 | Vallet et al. | 425/556 |
| 4,790,739 | 12/1988 | Manfredi | 425/195 |
| 5,186,953 | 2/1993 | Minaudo | 425/47 |

FOREIGN PATENT DOCUMENTS 62-48512  3/1987  Japan ........................................ 425/47

*Primary Examiner*—Scott Bushey
*Attorney, Agent, or Firm*—Oblon, Spivak, McClelland, Maier & Neustadt

[57] ABSTRACT

In a mold clamping device for clamping a mold to, and unclamping the mold from, a mold mounting member of a tire vulcanizing machine, a locking member has a neck section projectingly installed on the mounting surface of a mold. A guide hole of the mold mounting member, in which the locking member is inserted, has a larger-diameter section in a portion corresponding to the neck section. A chuck member has an expansion section which is slidably inserted in the guide hole, and expands in the larger-diameter section, engaging the neck section in the guide hole. A chuck withdrawing device withdraws the chuck member into the guide hole.

9 Claims, 3 Drawing Sheets

MOLD CLAMPING DEVICE FOR TIRE VULCANIZING MACHINE

BACKGROUND OF THE INVENTION

1. Field of the Invention

The present invention relates to a mold clamping device for clamping molds to, and unclamping the molds from, mold mounting members of a tire vulcanizing machine.

2. Description of the Related Art

In a conventional tire vulcanizing machine, upper and lower mold holding structures are provided on a free frame for tire vulcanization and formation, so that a lower mold will be mounted, face up, to the lower mold mounting member installed in the lower part of the press frame, and an upper mold is mounted, face down, to the upper mold mounting member which is vertically movable along the side of the press frame. The upper mold mounting member is moved down to the lower mold mounting member by means of a die-clamping cylinder, thereby closing the upper and lower molds. The upper and lower molds are opened as the upper mold mounting member is raised.

In tire production using the tire vulcanizing machine described above, a change in the size of tires to be formed is sometimes required to be effected in accordance with a production planning. In this case, the upper and lower molds are replaced as a set. In an ordinary tire vulcanizing machine, the upper and lower molds are fastened by bolts to the upper and lower mold mounting members. However, this type of fastening the molds by the use of the bolts needs labor accompanied by a danger. To prevent this, therefore, it is desired to automatize mold replacement. In order to meet this demand, the adoption of a mold clamping device for clamping the molds to, and unclamping the molds from, the mold mounting members has been proposed.

As this type of clamping device, a prior-art mold clamping device disclosed in Japanese Patent Laid-open No. Sho 57-167237 has been known. In this prior-art clamping device, the mold is provided with a hole into which a T-head bolt can be inserted, and further is provided with a slot, at right angles with the T head, in the bottom of the hole with which the T head engages. Furthermore the mold mounting member is provided with a T-head bolt rotating means and a withdrawing means.

The clamping device disclosed in Japanese Patent Laid-Open No. Sho 57-167237 requires the provision of such a hole and slot of complicated shapes by machining in the mold with which the T-head bolt can be engaged and disengaged. The prior-art clamping device, however, has such a problem that it is practically difficult to perform additional machining of the conventional mold which is fastened by a bolt. Further, the mold mounting member needs the provision of not only the T-head bolt withdrawing means but the rotating means, which will result in a complicated structure.

SUMMARY OF THE INVENTION

In view of the above-described problem inherent in the heretofore known techniques, it is an object of the present invention to provide a mold clamping device of simple construction for a tire vulcanizing machine without additional machining, or with a minimum additional machining, of the mold.

To achieve the above object, according to the present invention, there is provided a mold clamping device for clamping a mold to, and unclamping the mold from, a mold mounting member of a tire vulcanizing machine, comprising: a locking member having a neck section projectingly installed on the mounting surface of a mold; a guide hole of the mold mounting member, in which the locking member is inserted, having a larger-diameter section in a portion corresponding to the neck section; a chuck member having an expansion section which is slidably inserted in the guide hole, and expands in the larger-diameter section, engaging the neck section in the guide hole; and a chuck withdrawing means for withdrawing the chuck member into the guide hole.

Upon the withdrawal of the chuck member by the withdrawing means, the expansible section enters the guide hole and closes to engage the neck section of the locking member, thus clamping the mold and the mold mounting member. Reversely when the chuck member is pressed in, the expansible section goes into the larger-diameter section and opens to release the neck section of the locking member, unclamping the mold and the mold mounting member.

The foregoing object and other objects will become more apparent and understandable from the following detailed description thereof, when read in connection with the accompanying drawings.

DESCRIPTION OF THE PREFERRED EMBODIMENT

Figure 3:
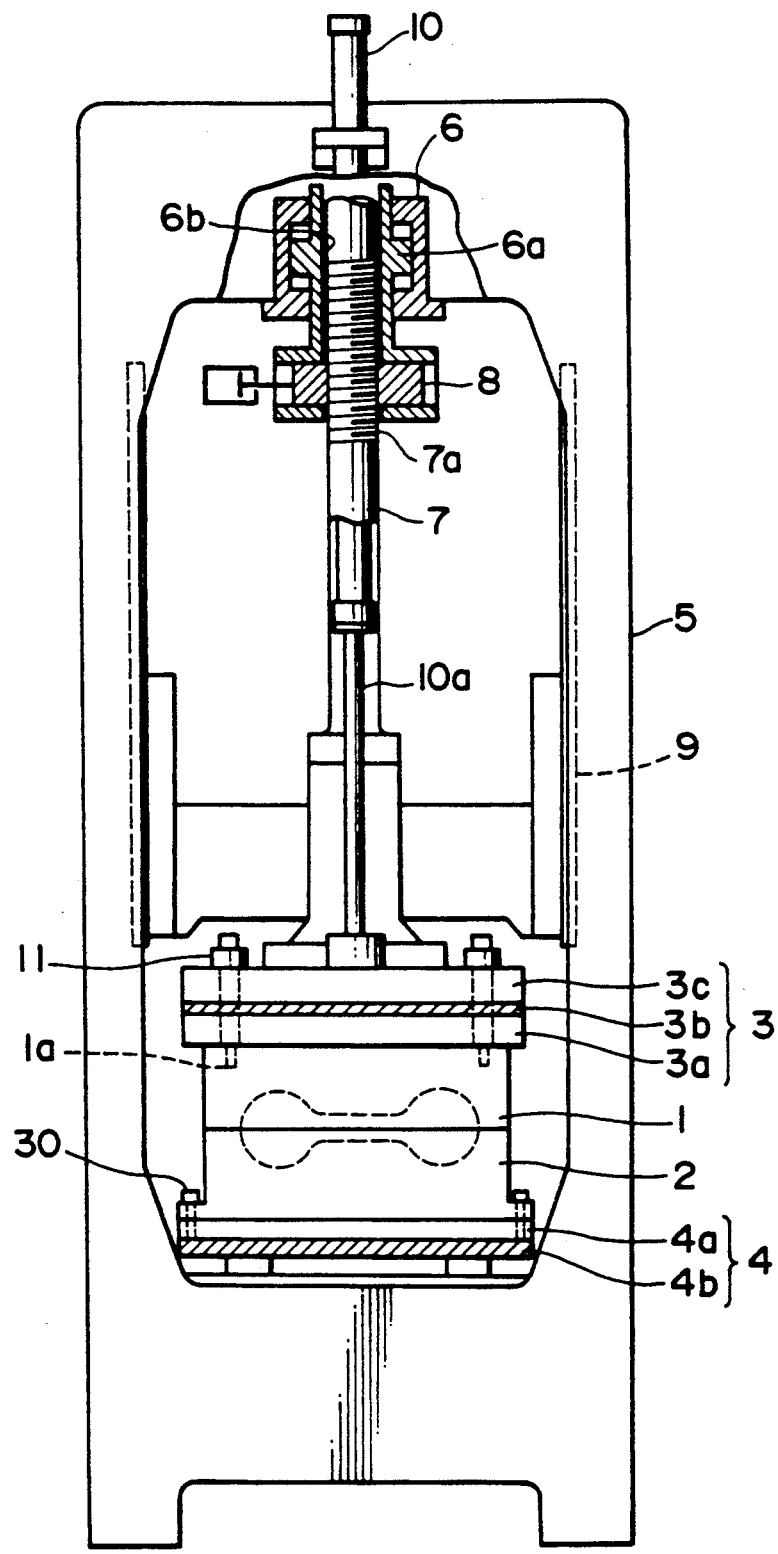
FIG. 3 is a view showing the construction of a tire vulcanizing machine using the mold clamping device of the present invention.

Hereinafter an exemplary embodiment of a mold clamping device according to the present invention will be explained with reference to the accompanying drawings. FIG. 3 is a front view of a tire vulcanizing machine to which the mold clamping device of the present invention is applied. First a description will be given of the general constitution of this tire vulcanizing machine, and then of the mold clamping device.

In FIG. 3, a numeral 1 denotes an upper mold; a numeral 2 refers to a lower mold; a numeral 3 is an upper mold mounting member consisting of a heating plate 3a, a heat insulating plate 3b and a platen 3c; a numeral 4 represents a lower mold mounting member consisting of a heating plate 4a and a heat insulating plate 4b; a numeral 5 refers to a press frame; a numeral 6 is a hollow pressure cylinder; a numeral 7 refers to a pressure transmission rod; a numeral 8 is an openable split nut; a numeral 9 refers to a guide for moving the upper mold mounting member 3 upward and downward; a numeral 10 refers to a cylinder for moving the upper mold mounting member 3 upward and downward. In such a tire vulcanizing machine as described above, when the split nut 8 is closed to engage a screw 7a of the pressure transmission rod 7, the piston 6a of the hollow pressure cylinder 6 moves downward to compress the upper mold 1 against the lower mold 2, thus molding a tire in the illustrated state. After thus molding, the tire is taken out by the following procedure. The pressure cylinder 6 is released to open the split nut 8, which in turn is disengaged from the screw 7a. Then, the rod 10a of the cylinder 10 contracts and accordingly the upper mold mounting member 3 moves upward, while being guided by the guide 9. The pressure transmission rod 7 passes through in the hollow section 6b of the hollow pressure cylinder 6. After the upper and lower molds 1 and 2 are fully opened, the molded tire will be taken out.

Figure 1:
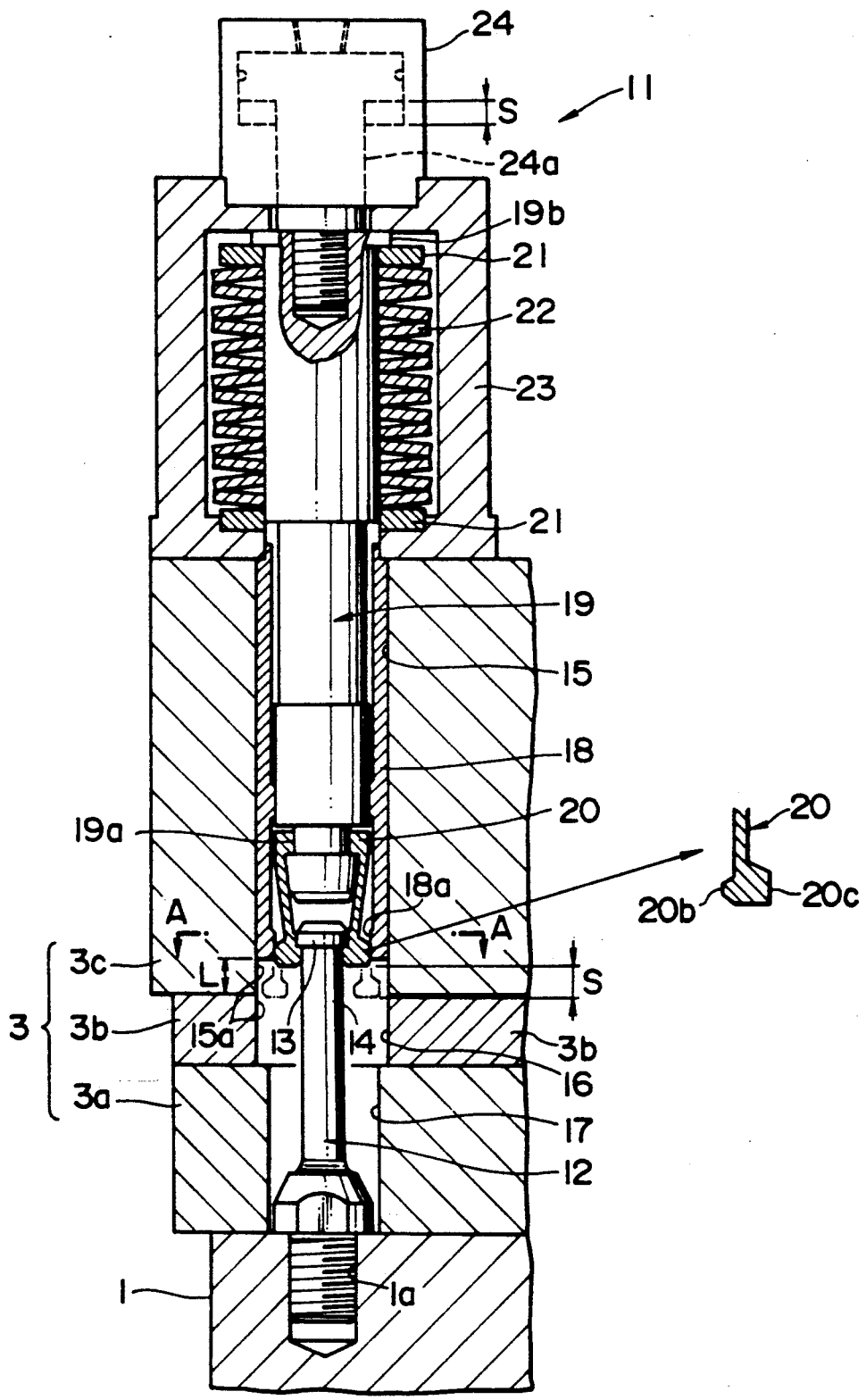
FIG. 1 is a sectional view of a mold clamping device of the present invention.

In this type of tire vulcanizing machine, the lower mold 2 is fastened by bolts 30 to the lower mold mounting member 4, while the upper mold 1 is mounted to the upper mold mounting member 3 by means of a clamping device 11 of the present invention. This clamping device 11 is disposed at four points on the circumference of the upper mold 1, attaching the upper mold 1 to the upper mold mounting member 3 by use of screw holes 1a provided in the upper mold 1. FIG. 1 is a sectional view of the mold clamping device of the present invention. In this drawing, a numeral 1 is an upper mold and a numeral 3 refers to the upper mold mounting member consisting of the heating plate 3a, the heat insulating plate 3b and the platen 3c. Hereinafter a detailed explanation will be made of this clamping device 11.

The locking member 12 is projectingly installed, face up, by utilizing the screw hole 1a provided for installation of a bolt in the mounting surface of the upper mold 1. This locking member 12 has a round or enlarged head 13 at the top, and a small-diameter neck section 14 thereunder.

In the platen 3c, the heat insulating plate 3b and the heating plate 3a, through holes 15, 16 and 17 have been machined. The round head 13 of the locking member 12 reaches the through hole 15. Inserted in this through hole 15 is a sleeve 18, the inner surface of which serves as a smaller diameter guide 18a. The sleeve 18 is not inserted in the full length of the through hole 15, but there is left a spacing L in the through hole 15, which, together with the through hole of the heat insulating plate 3b, forms a larger-diameter section 15a.

Figure 2:
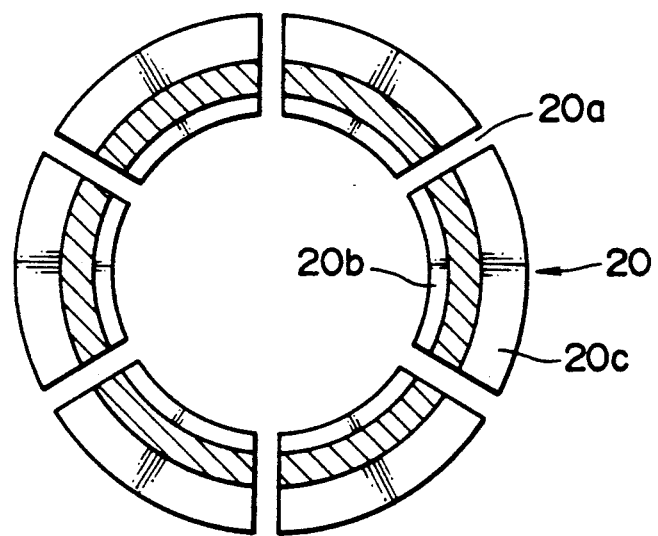
FIG. 2 is a sectional view taken along line A—A of FIG. 1, showing an expansible section of a chuck member.

In the guide hole 18a of the sleeve 18 is slidably inserted a chuck member 19, and an expansion section 20 is fitted in the neck section 19a provided at the lower end portion thereof. A flange 19b formed at the top end thereof is so adapted as to act on the dish spring 22 through the spacer 21. As shown in FIG. 2, the expansion section 20, provided with slits 20a, has an elastic force to expand outwardly. Also, the expansion section 20 is provided, at the lower end, with an inner projection 20b and an outer pro 20c. When the outer projection 20c is guided by guide hole 18a, the expansion section is narrowed so that the inner projection 20b comes into engagement with the neck section 14 under the round head 13 and grips the head. Then, the expansion section 20 opens outward with the elastic force as indicated by an alternate long and two short dashes line as it has moved downward by the amount of a spacing S and is too large to grip the head 13, thus disengaging the inner projection 20b from the neck section 14.

On the platen 3c is fixedly mounted, by a bolt, a housing 23 containing the dish spring 22 which serves as a chuck member withdrawing means. The chuck member 19, therefore, is withdrawn by this dish spring 22 toward the housing 23, pulling the locking member 12 upward until the upper mold 1 is clamped to the upper mold mounting member 3. On the housing 23 is secured a hydraulic cylinder 24 by a bolt, with the forward end of the piston 24a being screwed into the upper part of the chuck member 19. When this hydraulic cylinder 24 overcomes the force of the dish spring 22, moving for the spacing S, the expansion section 20 opens to the position indicated by an alternate long and two short dashes line. The chuck member 19 is withdrawn by means of the hydraulic cylinder 24.

Next, the mounting of the upper and lower molds 1 and 2 by the use of the clamping device 11 will be described. In FIG. 3, first, the upper mold mounting member is moved upward. Then, with a set of the upper and lower molds 1 and 2 mounted on the lower mold mounting member 4, the lower mold 2 is fastened by the bolt 30 to the lower mold mounting member 4. Then, the upper mold mounting member 3 is lowered. At this time, in FIG. 1, the hydraulic cylinder 24 has stroked for the spacing S, and the expansion section 20 of the chuck member 19 has been released In this state, the upper mold 1 is brought into con with the upper mold mounting member 3 until the head 13 of the locking member 12 is inserted in the guide hole 18a. Next, when the oil pressure is removed from the hydraulic cylinder 24, the upper clamping device is locked by the dish spring 22 as illustrated. That is to say, the upper mold 1 can be attached to the upper mold mounting member 3 by the clamping device 11 by utilizing the screw hole that has been machined in the mold or simply by adding a similar screw hole. This clamping device 11 having the simple construction as described above is able to clamp the upper and lower molds only by the use of the upward and downward withdrawing means.

The hydraulic cylinder 24 of the clamping device 11 is used when mounting and removing the upper mold 1. Since the clamping force is imparted by the dish spring 22, the upper mold 1 mounting and removal can be effected with safety. However, when the hydraulic cylinder 24 is equipped with a safety device for the prevention of an oil pressure drop in the hydraulic circuit, it is possible to withdraw the chuck member simply by using the hydraulic cylinder in place of the combination of the dish spring in FIG. 1 and the hydraulic cylinder. It is to be understood that the clamping device 11 of the present invention should not be limited to the mounting of the upper mold 1, but may be used for the mounting of the lower mold 2. Furthermore this clamping device 11 should not be limited to the tire vulcanizing machine of the type shown in FIG. 3, but is applicable also to a dome lock-type tire vulcanizing machine.

In the mold clamping device of the present invention, when the chuck member is withdrawn, the expansion section thereof goes into the guide hole to close itself, thereby engaging the neck section of the locking member to clamp the mold and the mold mounting member. Therefore the mold may be fitted only with the locking member and can be clamped by utilizing the screw hole or simply by adding a like screw hole. It is, therefore, possible to dispense with or minimize the additional machining of the mold. Furthermore the chuck member, which can be engaged and disengaged by means of the withdrawing means, becomes of a simple construction.

The present invention has been described in detail with particular reference to a preferred embodiment thereof but it will be understood that variations and modifications can be effected within the spirit and scope of this invention.

What is claimed is:

1. A mold clamping device in combination with a mold mounting member of a tire vulcanizing machine for selectively clamping the mold mounting member to a mold of the tire vulcanizing machine, the mold mounting member having a through hole, said mold clamping device comprising:

means in the through hole for defining a larger diameter section and a small diameter guide hole;

a locking member having a neck section and an enlarged head, said locking member being mountable to the mold such that said neck section extends into said larger diameter section and said enlarged head extends into said guide hole;

a chuck member slidably extending into the through hole, an expansion section mounted for movement with the chuck member and into which said locking member extends, wherein said expansion section is dimensioned to be too large to grip the enlarged head when said expansion section is in said larger diameter section, and wherein said expansion section is narrowed by the guide hole to grip the enlarged head when the expansion section is withdrawn into the guide hole, thereby clamping the mold mounting member to the mold; and means for selectively moving the chuck member in the through hole.

2. A mold clamping device of said tire vulcanizing machine as claimed in claim 1, wherein said mold is an upper mold.

3. A mold clamping device of said tire vulcanizing machine as claimed in claim 1, wherein said mold is a lower mold.

4. A mold clamping device of said tire vulcanizing machine as claimed in claim 1, wherein said expansion section has an inner and an outer projection.

5. A mold clamping device of said tire vulcanizing machine as claimed in claim 4, wherein when said outer projection bears against said guide hole, said inner projection comes into engagement with said neck section of said locking member.

6. A mold clamping device of said tire vulcanizing machine as claimed in claim 5, wherein said expansion section, when in the larger-diameter section, elastically opens to release said locking member.

7. A mold clamping device according to claim 1 wherein said means for selectively moving said chuck member comprises elastic means for withdrawing said expansion section into said guide hole.

8. A mold clamping device of said tire vulcanizing machine as claimed in claim 7 wherein said elastic means comprises a dish spring.

9. A mold clamping device according to claim 7 wherein said means for selectively moving said chuck member further comprise hydraulic means for moving said expansion section into said larger diameter section in opposition to said elastic means.

* * * * *